United States Patent
Eguchi et al.

(10) Patent No.: US 8,539,591 B2
(45) Date of Patent: Sep. 17, 2013

(54) DOCUMENT MANAGEMENT SYSTEM, MANAGEMENT DEVICE, RECORDING MEDIUM STORING DOCUMENT MANAGEMENT PROGRAM, DOCUMENT MANAGEMENT METHOD AND DATA SIGNAL

(75) Inventors: Hiroyuki Eguchi, Kanagawa (JP); Hiroyoshi Uejo, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 823 days.

(21) Appl. No.: 12/147,004

(22) Filed: Jun. 26, 2008

(65) Prior Publication Data
US 2009/0064275 A1    Mar. 5, 2009

(30) Foreign Application Priority Data

Aug. 28, 2007 (JP) ................................. 2007-221089

(51) Int. Cl.
G06F 21/00 (2013.01)
(52) U.S. Cl.
USPC ............................. 726/26; 713/193; 358/1.14
(58) Field of Classification Search
USPC .......... 726/2, 26–30; 380/200–204; 713/193
See application file for complete search history.

(56) References Cited

U.S. PATENT DOCUMENTS

| | | | | |
|---|---|---|---|---|
| 5,825,892 | A * | 10/1998 | Braudaway et al. | 380/51 |
| 2001/0016851 | A1 * | 8/2001 | Gramsamer et al. | 707/200 |
| 2002/0129255 | A1 * | 9/2002 | Tsuchiyama et al. | 713/176 |
| 2004/0093309 | A1 * | 5/2004 | Nakamura et al. | 705/65 |
| 2004/0153649 | A1 * | 8/2004 | Rhoads et al. | 713/176 |
| 2006/0262962 | A1 * | 11/2006 | Hull et al. | 382/103 |

FOREIGN PATENT DOCUMENTS

| | | |
|---|---|---|
| JP | A-2000-181868 | 6/2000 |
| JP | A-2001-297102 | 10/2001 |
| JP | A-2001-325249 | 11/2001 |
| JP | A-2003-016057 | 1/2003 |
| JP | A-2004-280227 | 10/2004 |
| JP | A-2005-275759 | 10/2005 |
| JP | A-2006-072551 | 3/2006 |

OTHER PUBLICATIONS

Japanese Office Action issued in Japanese Application No. 2007-221089 dated May 29, 2012 (w/ Translation).
Nov. 6, 2012 Office Action issued in Application No. 2007-221089 (with translation).

* cited by examiner

*Primary Examiner* — Gilberto Barron, Jr.
*Assistant Examiner* — David Le
(74) *Attorney, Agent, or Firm* — Oliff & Berridge, PLC (57) ABSTRACT

A document management system, which includes a management section that manages identification information corresponding to a component included in a document; a setting section that sets the identification information managed by the management section to the component included in the document; and a history management section that manages history information of the component corresponding to the identification information that is set to the component by the setting section.

19 Claims, 11 Drawing Sheets

EXAMPLE OF CONFIGURATION OF
OBJECT INFORMATION

FIG.3

SETTING METHOD MANAGEMENT TABLE FOR PAPER DOCUMENT

| TYPE OF OBJECT | EMBEDDING METHOD |
|---|---|
| TEXT (CHARACTER) | SPACE BETWEEN CHARACTERS |
| GRAPHIC | INVISIBLE TONER |
| IMAGE | INVISIBLE TONER |
| TABLE | WATERMARKING |
| ⋮ | ⋮ |

SETTING METHOD MANAGEMENT TABLE FOR ELECTRONIC DOCUMENT

| TYPE OF OBJECT | EMBEDDING METHOD |
|---|---|
| TEXT (CHARACTER) | SPACE BETWEEN CHARACTERS |
| GRAPHIC | DIGITAL WATERMARKING |
| IMAGE | DIGITAL WATERMARKING |
| TABLE | HYBRID WATERMARKING |
| ⋮ | ⋮ |

FIG.4

OBJECT LOCATION MANAGEMENT TABLE

| DOCUMENT ID | PAGE ID | OBJECT ID | TYPE OF OBJECT |
|---|---|---|---|
| 678 | 12345 | obj001 | TEXT |
| 678 | 12345 | obj002 | GRAPHIC |
| 678 | 12345 | obj003 | IMAGE |
| 678 | 12345 | obj004 | TABLE |
| ⋮ | ⋮ | ⋮ | ⋮ |

FIG.5A

SECURITY MANAGEMENT TABLE

| OBJECT ID | SECURITY LEVEL |
|---|---|
| obj001 | 0001-LOW CONFIDENTIAL LEVEL (AVAILABLE FOR GENERAL EMPLOYEE OR HIGHER) |
| obj002 | 0003-HIGH CONFIDENTIAL LEVEL (AVAILABLE FOR OFFICER OR HIGHER) |
| obj003 | 0001-LOW CONFIDENTIAL LEVEL (AVAILABLE FOR GENERAL EMPLOYEE OR HIGHER) |
| obj004 | 0002-MIDDLE CONFIDENTIAL LEVEL (AVAILABLE FOR SENIOR MANAGER OR HIGHER) |
| ⋮ | ⋮ |

FIG.5B

HISTORY INFORMATION MANAGEMENT TABLE

| OBJECT ID | HISTORY INFORMATION |
|---|---|
| obj001 | ORIGINAL |
| obj002 | COPY FROM DOCUMENT WITH DOCUMENT ID: aaa AND PAGE ID: xxx TO DOCUMENT WITH DOCUMENT ID: bbb AND PAGE ID: yyy |
| obj003 | COPY FROM DOCUMENT WITH DOCUMENT ID: aaa AND PAGE ID: xxx TO DOCUMENT WITH DOCUMENT ID: bbb AND PAGE ID: yyy |
| obj004 | COPY FROM DOCUMENT WITH DOCUMENT ID: aaa AND PAGE ID: xxx TO DOCUMENT WITH DOCUMENT ID: bbb AND PAGE ID: yyy |
| ⋮ | ⋮ |

DOCUMENT MANAGEMENT SYSTEM, MANAGEMENT DEVICE, RECORDING MEDIUM STORING DOCUMENT MANAGEMENT PROGRAM, DOCUMENT MANAGEMENT METHOD AND DATA SIGNAL

CROSS-REFERENCE TO RELATED APPLICATION

This application is based on and claims priority under 35 USC 119 from Japanese Patent Application No. 2007-221089 filed on Aug. 28, 2007.

BACKGROUND

1. Technical Field

The present invention relates to a document management system, a management device, a recording medium storing a document management program, a document management method and a data signal.

2. Related Art

Recently, as the security for a paper document or an electronic document (hereinafter, collectively also referred to as "document") is considered as the most important issues, a demand for making the document traceable has become increasingly strong. The wording "making the document traceable" herein refers to tracing and recording a series of document life cycle (from electronic document to paper, or from paper to electronic document), such as who prints out the electronic document when, and how the state of the printed paper document is. For example, the document is made up of a table, diagram, image, text or other various kinds of components. There may exist a case where those components are separately decomposed and/or a different document is generated from them.

SUMMARY

An aspect of the present invention provides a document management system, which includes a management section that manages identification information corresponding to a component included in a document; a setting section that sets the identification information managed by the management section to the component included in the document; and a history management section that manages history information of the component corresponding to the identification information that is set to the component by the setting section.

BRIEF DESCRIPTION OF THE INVENTION

An exemplary embodiment of the present invention will be described in detail based on the following figures, wherein.

DETAILED DESCRIPTION

Hereinbelow, with reference to the attached drawings, an example of a document management system, a management device, a recording medium storing a document management program, a document management method and a data signal according to the present invention will be described in detail.

Figure 1:
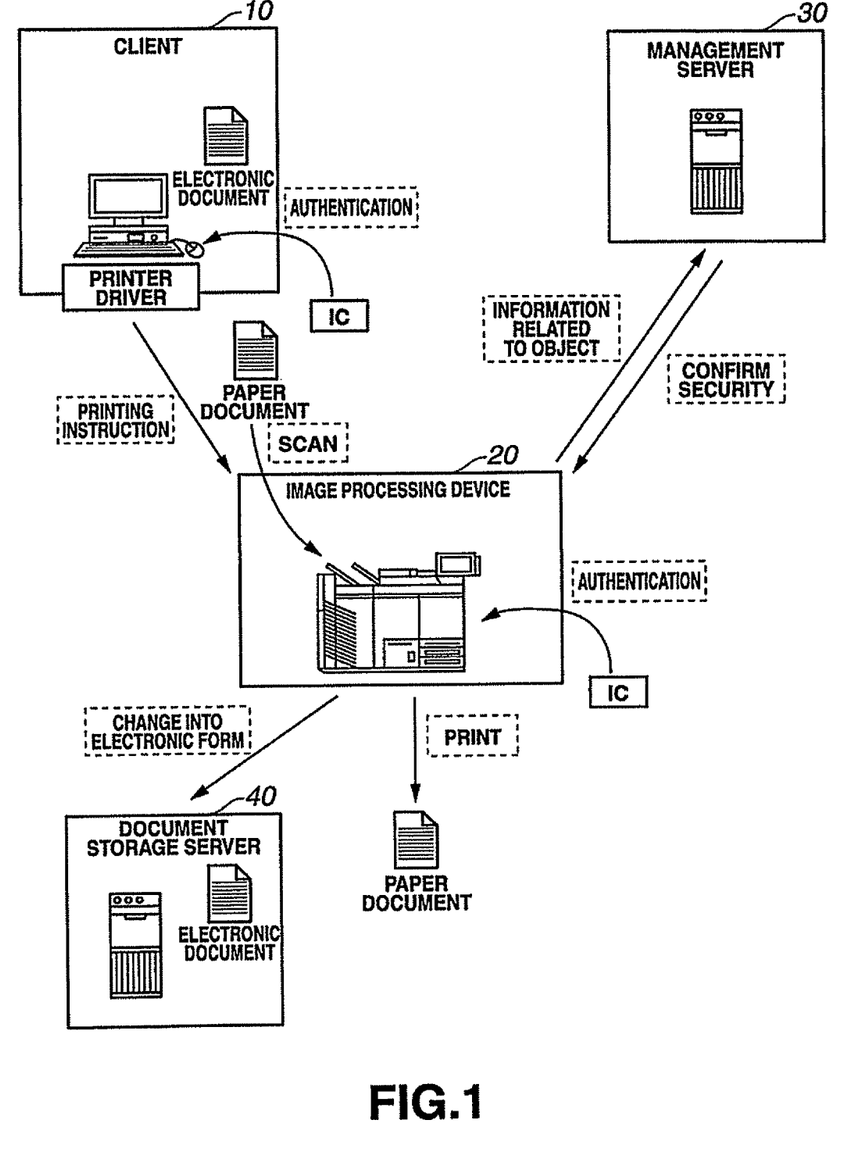
FIG. 1 is a diagram showing an example of an overall configuration of a document management system according to one exemplary embodiment of the present invention.

FIG. 1 is a diagram showing an example of an overall configuration of the document management system according to one exemplary embodiment of the present invention.

In the document management system, a client 10, an image processing device 20, a management server 30 and a document storage server 40 are connected through a network formed with a LAN (Local Area Network), a WAN (Wide Area Network) and so on. It should be noted that this network configuration is just one example. In addition to the network configuration above, a printer or various servers may be connected to the network.

The client 10 is a computer or the like that is used by a user. In this example, the client 10 especially performs a function of generating an electronic document, providing an instruction to print out the electronic document and so on. At the time of printing out, the instruction to print out is given, for example, via a printer driver.

The image processing device 20 has, in whole or in part, a printing function, copying function, scanning function and so on. In this example, the image processing device 20 especially performs a function of printing out based on the instruction from the user, reading and copying a paper document or changing the paper document into an electronic form.

The management server 30 performs a function of managing a document and so on in this system. In this example, the management server 30 especially manages information related to an electronic document, a paper document and each object (for example, graphic, table, image, text and so on) forming the documents, information related to security applied to each of the objects and so on.

The document storage server 40 performs a function of storing the electronic document. The document storage server 40 stores an electronic document for which an order to store is given from the client 10, an electronic document that is changed into an electronic form by the image processing device 20 and so on.

These are the description of the overall configuration of the document management system according to the present invention. It should be noted that each of the client 10, the image processing device 20, the management server 30, the document storage server 40 and so on includes a computer In the computer, a CPU (Central Processing Unit) and so on functioning as a main controlling unit; a ROM (Read Only Memory), a RAM (Random Access Memory), a HDD (Hard Disk Drive) and so on, which function as a storing unit; a keyboard, a mouse, a display and so on, which function as an inputting unit; and a network card and so on, which function as a communication unit are connected through a bus. Each of the units stated above is controlled through executing, by the main controlling unit, a program stored in the storing unit.

Now, a document ID is set to a document managed in the document management system. Additionally, a page ID is set to each page in the document. Then, an object ID is set to each object in the document.

Figure 2:
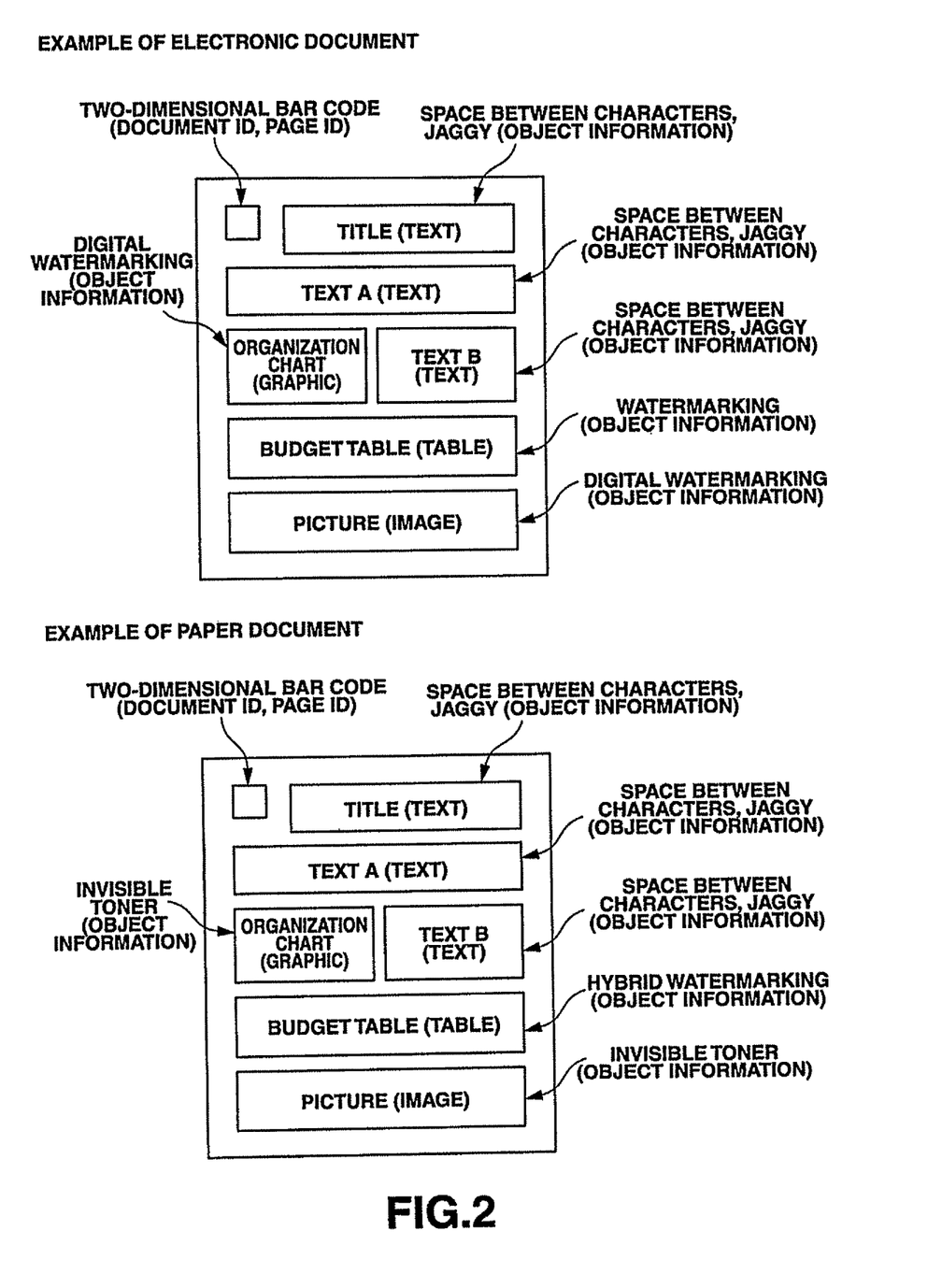
FIG. 2 is a diagram showing examples of an electronic document and a paper document.

FIG. 2 illustrates examples of an electronic document and a paper document. The electronic document shown in the upper part of FIG. 2 includes such object as a title, text A, an organization chart, text B, a budget table and a picture. To each of the objects, object information in a format according to a property (type of the object in this example) of the object is embedded. For example, since the title, the text A and the text B are formed with textual information, the object information is embedded to a space between characters or using jaggy of a character and so on. Additionally, for example, since the organization chart and the picture are formed with graphic or image, the object information is embedded using digital watermarking. Additionally, for example, in the table, the object information is embedded to a margin of a cell and so on using watermarking. Furthermore, the document ID and the page ID of the electronic document are embedded using a two-dimensional bar code.

Additionally, an example of a paper document is shown in the lower portion of FIG. 2. This paper document is obtained by printing out the electronic document described above. As is the case with the electronic document above, the paper document includes objects. Furthermore, as is the case with the electronic document above, the object information is embedded in each of the objects. In the paper document, the object information is embedded in a form different from the electronic document as described above. For example, in the organization chart and the picture, the object information is embedded using an invisible toner (e.g. yellow) rather than the digital watermarking. In the table, for example, the object information is embedded using a hybrid watermarking with a visible toner and so on rather than the watermarking. In the title, the text A and the text B, for example, the object information is embedded to a space between characters and so on as is the case with the electronic document above. It should be noted that the reason that the method of embedding the object information is changed depending on the property of the object, embedding destination (i.e. whether paper document or electronic document) or the like is, for example, to prevent the appearance of the document from deteriorating, avoid information from missing and so on.

Figure 3:
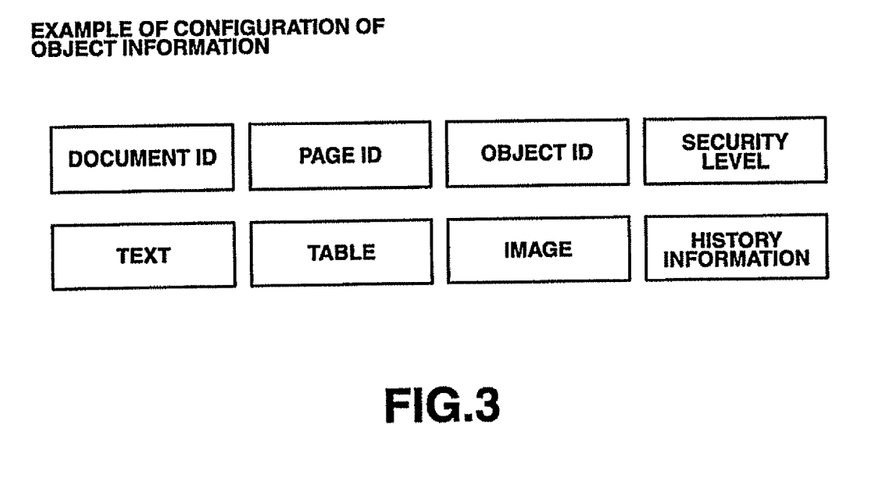
FIG. 3 is a diagram showing an example of a configuration of object information.

Here, the object information described above contains the object ID for identifying at least the object. As shown in FIG. 3, the object information includes, for example, the document ID, the page ID, the object ID, a security level, the text, the table, the image, history information and so on. It should be noted that areas for the text, the table and the image contain a flag indicating a type of the object and so on. For example, if the object is text, the flag is set in the area for the text.

Figure 4:
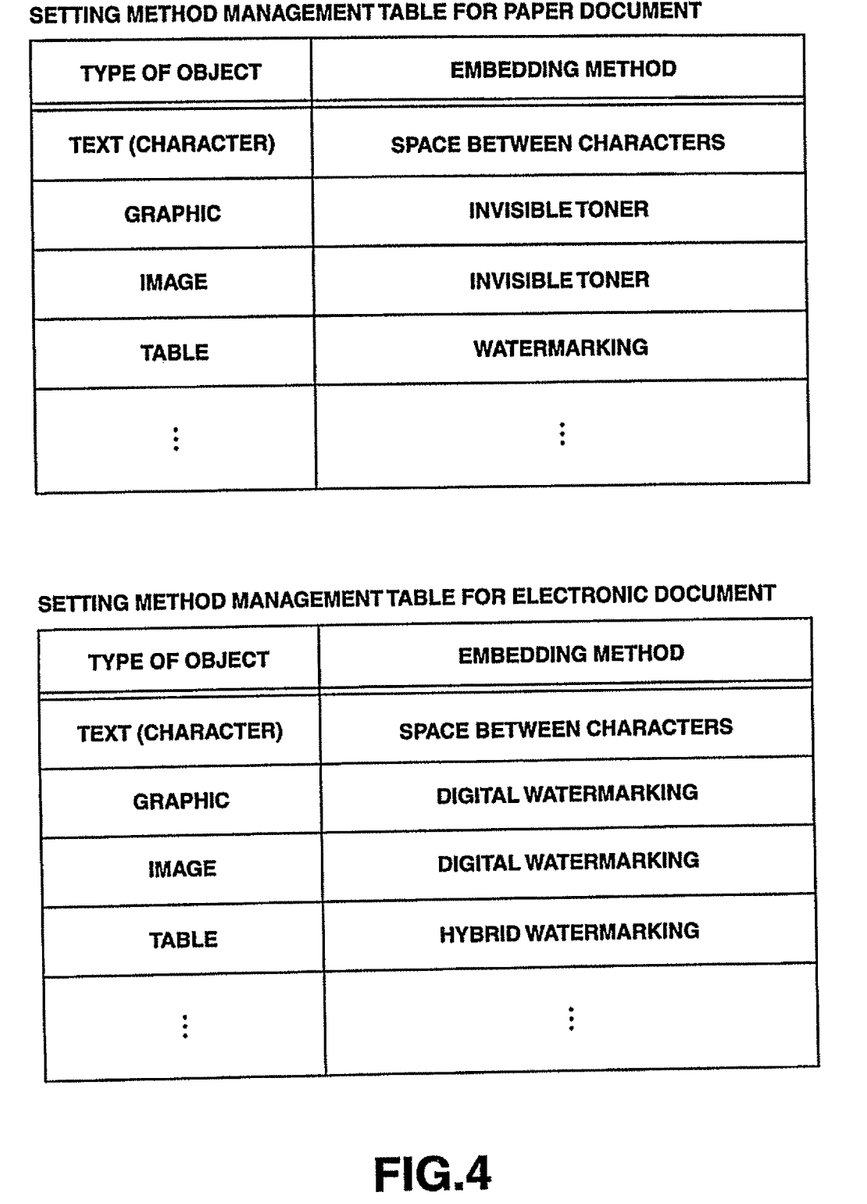
FIG. 4 is a diagram showing an example of a table configuration of a setting method management table.

The method of embedding the object information in the document is managed by the management server 30 using a setting method management table shown in FIG. 4. In the setting method management table, the method of embedding the object information is stipulated in correspondence with the type of the object. There are two types of the setting method management tables, in other words, the table for the paper document (from the electronic document to the paper document; and from the paper document to the paper document) and the table for the electronic document (newly generated electronic document; and from the paper document to the electronic document). For example, when the electronic document is printed out, the object information is embedded in each object based on the information stipulated in the setting method management table for the paper document.

Figure 5A:
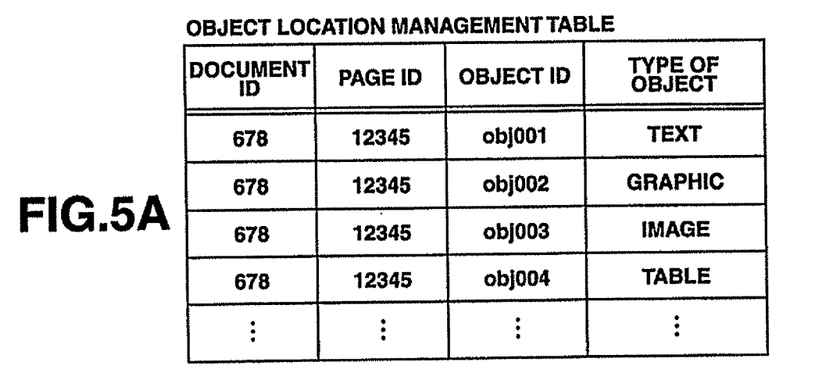
FIGS. 5A to 5C are diagrams showing table configurations of tables that manage information related to the objects.
Figure 5B:
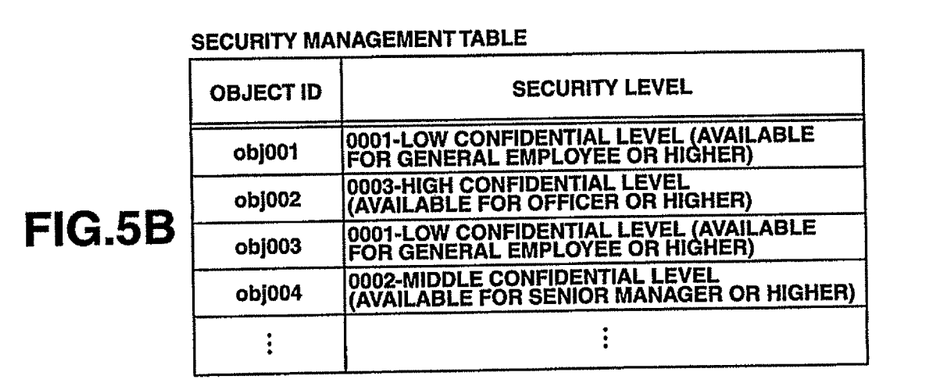
Figure 5C:
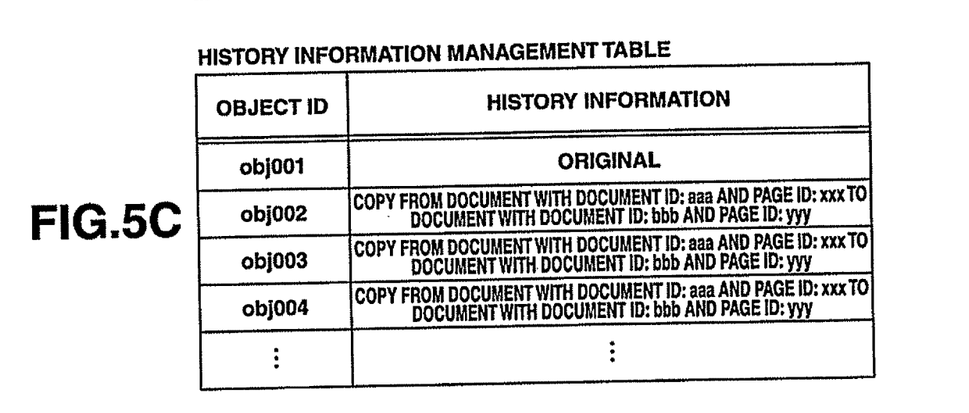

Additionally, the management server 30 manages information on each object using tables shown in FIGS. 5A to 5C. In an object location management table shown in FIG. 5A, the object ID corresponding to the document ID and the page ID, and a type of the object are managed. The object location management table provides information on what kind of form the object exits on which page in which document.

In a security management table shown in FIG. 5B, a security level of the object ID is managed in correspondence with the object ID. The security management table provides a confidential level specified to each object. For example, if the user who is not given a sufficient security level attempts to printing out, such object is blacked out, erased or the like, and the object becomes no longer readable (which means the object is replaced with a meaningless form). It should be noted that the security level may be formed so as to provide information concerning the range of application/operation of the object.

In a history information management table shown in FIG. 5C, history information is managed in correspondence with the object ID. The history information management table provides a history corresponding to the object, such as which object is cut from which page in which document, and the cut object is pasted to and exists on which page in which document.

Figure 6:
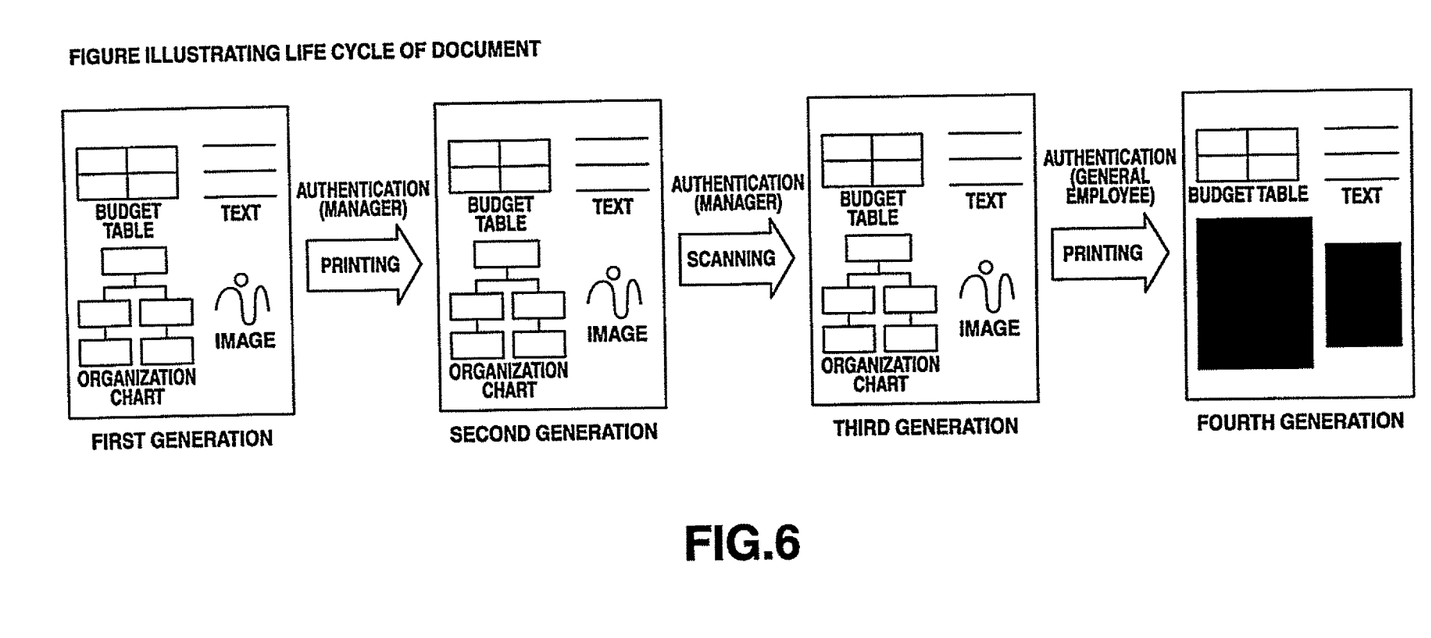
FIG. 6 is a diagram showing an example of a life cycle flow of a document in the document management system shown in FIG. 1.

Next, using FIG. 6, a lifecycle flow of a document in the document management system will be described briefly.

Initially, there exits an electronic document in which object information is embedded in each object (first-generation document). It is assumed that the electronic document is printed out by a user who has an authority corresponding to a manager. The paper document obtained as a result of the printing (second-generation document) is a printed out document in which the information similar to the electronic document, which is a source of the printing, is printed and visualized. Then, it is assumed that the paper document is changed into an electronic form again. The electronic document obtained as a result of the changing (third-generation document) is an electronic document similar to the original electronic document. Furthermore, it is assumed that a user who has an authority corresponding to a general employee makes a copy of this electronic document. In the paper document obtained as a result of the copying (fourth-generation document), objects (an organization chart and an image) to which permission is not given are made unreadable by being blacked out and so on.

As described above, in the document management system, even if printing, copying, scanning and/or the like is repeatedly performed in the life cycle of a document, the security of each object in the document is transferred and maintained.

Figure 7:
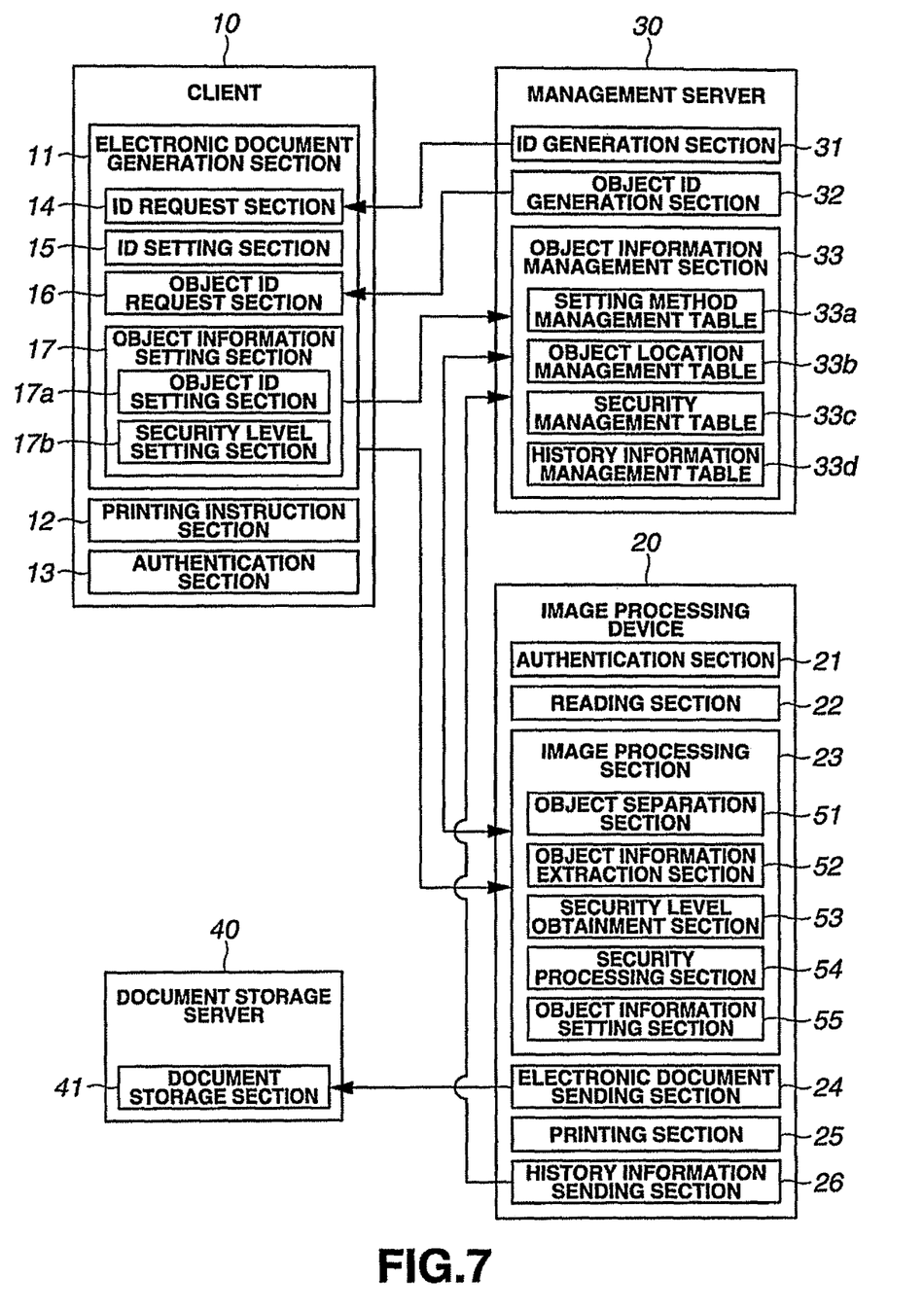
FIG. 7 is a diagram showing an example of a functional configuration of each device in the document management system shown in FIG. 1.

Next, using FIG. 7, one example of a functional configuration of the document management system shown in FIG. 1 above in each of the devices will be described.

The client 10 includes an electronic document generation section 11 that generate an electronic document, a printing instruction section 12 that instructs to print out the electronic document and so on, and an authentication section 13 that performs user authentication in response to the printing-out instruction and so on. The electronic document generation section 11 includes an ID request section 14 that requests a document ID and a page ID at the time of generating the electronic document, an ID setting section 15 that sets and embed the document ID and the page ID to the electronic document based on the request, an object ID request section 16 that requests an object ID of an object in the electronic document, and an object information setting section 17 that embeds and sets to the object the object information including the object ID based on the request. The object information setting section 17 includes an object ID setting section 17a that sets the object ID, and a security level setting section 17b that sets a security level of the object based on user input.

The management server 30 includes an ID generation section 31, an object ID generation section 32, and an object information management section 33. The ID generation section 31 generates and sends back the document ID and the page ID in response to the request from the client 10. The object information generation section 32 generates and sends back the object ID in response to the request from the client 10. The object information management section 33 manages information related to the object and so on using a setting method management table 33a, an object location management table 33b, a security management table 33c and a history information management table 33d, and responds to the request from the client 10, the image processing device 20 and so on.

The image processing device 20 includes an authentication section 21 that performs user authentication in response to the instruction to copy or read such as scan and so on, an reading section 22 that reads image information from the paper document, an image processing section 23 that performs image processing of the read image information and so on, an electronic document sending section 24 that sends the processed image information as an electronic document to the document storage server 40 and so on, a printing section 25 that forms an image based on the processed image information and performs printing, and a history information sending section 26 that sends a history of the object to the management server 30. The image processing section 23 includes an object separation section 51 that separates the object from the image information, an object information extraction section 52 that extracts the object information including the object ID from the separated object (the object information is removed from the object that is an extraction source), a security level obtainment section 53 that obtains a security level corresponding to the extracted object ID, a security processing section 54 that applies security processing to the object based on the obtained security level, and an object information setting section 55 that embeds and sets the object information to the object.

The document storage server 40 includes a document storage section 41 that stores the electronic document sent from the image processing device 20 and so on. These are the description of each of the devices. It should be noted that, although the functional configurations of the client 10, the image processing device 20, the management server 30 and the document storage server 40 are described above using FIG. 7, the functional configuration provided to each of the devices is not limited to the configuration as illustrated above and in the figures. It may be possible to realize the whole of the functional configurations by forming a whole or part of the functional configuration in any of the devices above. For example, the management server 30 may be omitted by realizing the whole functions of the management server 30 in the image processing device 20.

Figure 8:
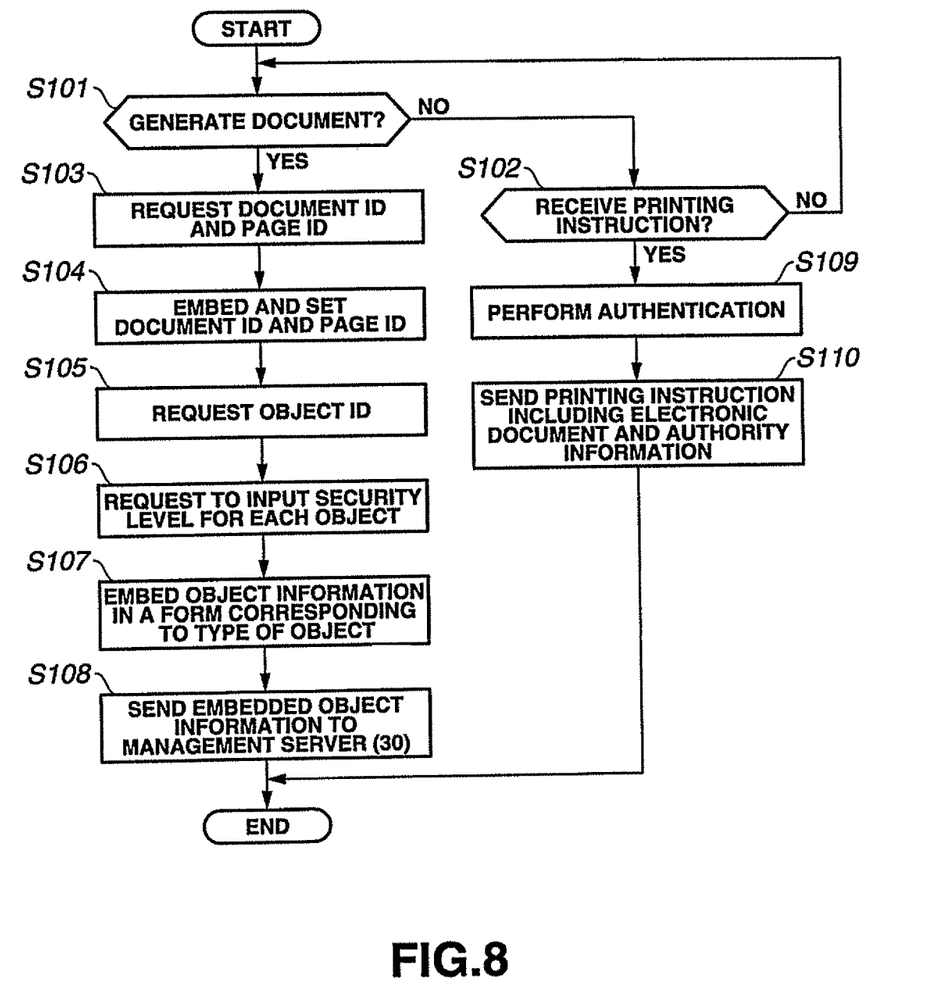
FIG. 8 is a flow chart showing a flow of operation in a client 10 shown in FIGS. 1 and 7.

Next, using FIGS. 8 to 10, the operation of each of the devices in the document management system as shown in FIG. 1 will be described.

Initially, using FIG. 8, an operational flow in the client 10 will be described.

The client 10 is on standby until a document is generated or printing is instructed (No in step S102 after NO in step S101). If a user generates a document in this mode (YES in step S101), the ID request section 14 in the client 10 requests a document ID and a page ID from the server 30 (step S103) and the ID setting section 15 embeds and sets the document ID and the page ID sent in response to the request in the electronic document in a form of, for example, two dimensional bar code and so on (step S104).

Then, the object ID request section 16 in the client 10 requests an object ID of each object from the management server 30 (step S105). This request includes a type of the object existing in the electronic document. Then, upon receiving the object ID in response to the request, the client 10 requests the user to input a security level to be attached to the object (step S106). Once the user inputs the security level for the object in response to the request, the object information setting section 17 in the client 10 embeds and sets to the object the object information including the object ID received from the management server 30 and the inputted security level in accordance with the embedding method, which is sent from the management server 30 together with the object ID (step S107). After the setting is completed, the object information setting section 17 sends the embedded object information to the management server 30 (step S108). Then, the processing ends. If the object information is embedded and set to plural pages, processing similar to the processing as described above is repeated for each page.

Upon receiving a printing instruction from the user at the time of the standby mode in step S101 and step S102 above (YES in step S102 after NO in step S101), the client 10 requests the user to perform authentication. Once the user inputs authentication information using an IC card and so on in response to the request, the authentication section 13 in the client 10 performs user authentication (step S109), and the printing instruction section 12 sends the printing instruction including the electronic document and authority information to the image processing device 20 (step S110). Then, the processing ends.

Next, using FIG. 9, an operation flow in the image processing device 20 will be described. It should be noted that the description here will be made by giving an example of operation at the time of obtaining the security level of the object from the management server 30 rather than obtaining it from the object information embedded in the object in the document.

The image processing device 20 is on standby until it receives the printing instruction or an instruction to read the paper document (for example, scanning or copying; NO in step S202 after NO in step S201). Upon receiving the printing instruction from the client 10 in this mode (YES in step S201), the object separation section 51 in the image processing device 20 separate the object from the electronic document included in the instruction, and the object information extraction section 52 extracts the object information from the separated object (step S203).

Upon completing the extraction of the object information, the security level obtainment section 53 in the image processing device 20 sends a security request including the extracted one or more object IDs to the management server 30, and obtains the security level corresponding to each object from the management server 30 (step S204).

Then, the security processing section 54 in the image processing device 20 performs processing of the object based on the obtained security level and the authority information of the user, who instructs to print out, included in the printing instruction above (step S205). In this processing, for example, if there exists an object in which user authority is not satisfied, the object is made unreadable through being blacked out and so on.

Upon completing this processing, the object information setting section 55 in the image processing device 20 obtains the embedding method corresponding to the type of the separated object from the management server 30 (step S206), and embeds and sets the object information to each object in accordance with the obtained embedding method (step S207). And, the printing section 25 performs printing based on the printing instruction received in step S201 (step S208), while the history information sending section 26 sends the history of the object related to the processing above to the management server 30 (step S209). Then, the processing ends.

Upon receiving an instruction to read a paper document from the user at the time of the standby mode in step S201 and step S202 above (YES in step S202 after NO in step S201), the image processing device 20 requests the user to perform authentication. Once the user inputs authentication information using an IC card and so on in response to the request, the authentication section 21 in the image processing device 20 performs user authentication (step S210), while the reading section 22 reads the paper document for which the reading instruction is given in step 202 (step S211). Then, the object separation section 51 separates each object in the read paper document, and the object information extraction section 52 extracts the object information from the separated objects (step S212).

Upon completing extracting the object information, the security level obtainment section 53 in the image processing device 20 sends a security request including the extracted one or more object IDs to the management server 30, and obtains the security level corresponding to each object from the management server 30 (step S213).

The security processing section 54 in the image processing device 20 performs processing of each object based on the obtained security level and the authority information of the user, which is specified through the authentication in step S210 (step S214). In this processing, for example, if there exists an object in which user authentication is not satisfied, the object is made unreadable through being blacked out and so on.

Upon completing the processing, the object information setting section in the image processing device 20 obtains the embedding method corresponding to the type of the separated object from the management server 30 (step S215), and embeds and sets the object information to each object in accordance with the obtained embedding method (step 3216). If the reading instruction in step S202 is based on copying (YES in step 217), the printing section 25 performs printing out based on the copying instructed in step S202 (step S218). If the reading instruction in step S202 is based on the instruction to change the paper document into an electronic form (NO in step S217), the electronic document sending section 24 in the image processing device 20 sends the processed image information as an electronic document to the document storage server 40 (step S219). Then, the history information sending section 26 in the image processing device 20 sends a history of the object related to the processing above to the management server 30 (step S209), and the processing ends. It should be noted that, in step S219, the electronic document may be sent to a sending destination other than the document storage server 40, and may be sent, for example, to a storage region in the image processing device 20 itself and so on.

Next, using FIG. 10, an operational flow in the management server 30 will be described.

The management server 30 is on standby until it receives information request and so on from each of the devices (NO in steps S301 to S305). Upon receiving a request for a document ID and a page ID from the client 10 in this state (YES in step S301), the management server 30 generates, in the ID generation section 31, the document ID and the page ID (step S306), and sends the generated document ID and the page ID to the client 10 (step S307). Then, the processing ends.

Upon receiving a request for an object ID from the client 10 in the standby mode in the steps S301 to S305 above (YES in step S302 after NO in step S301), the management server 30 generates, in the object ID generation section 32, the object ID (step S308), and sends the generated object ID and the embedding method corresponding to the type of the object to the client 10 (step S309). Then, the processing ends.

Additionally, upon receiving the object information from the client 10 or the history from the image processing device 20 in the standby mode in steps S301 to S305 above (YES in step S303 after NO in steps S301 and S302), the management server 30 updates, in the object information management section 33, each of the tables based on the received information (step S310). Then, the processing ends.

Additionally, upon receiving the security request from the image processing device 20 in the standby mode in steps S301 to S305 above (YES in step S304 after NO in steps S301 to S303), the management server 30 obtains, in the object information management section 33, one or more object IDs included in the request (step S311), and sends the security level corresponding to each of the one or more object IDs to the image processing device 20 (step S312). Then, the processing ends.

Additionally, upon receiving a request for a embedding method of object information from the image processing device 20 in the standby mode in steps S301 to S305 above (YES in step S305 after NO in steps S301 to S304), the management server 30 obtains, in the object information management section 33, the embedding method corresponding to the type of the object included in the request (step S313), and sends the obtained embedding method to the image processing device 20 (step S314). Then, the processing ends.

These are descriptions of one example of a typical exemplary embodiment of the present invention. However, the present invention is not limited to the example as described above and illustrated in figures, and may be realized through modification as appropriate without departing from the spirit and scope thereof.

For example, in the description above, the security level is managed in correspondence with each object (see FIGS. 5A to 5C). However, it may be possible to manage the security level corresponding to a group of the object.

Figure 9:
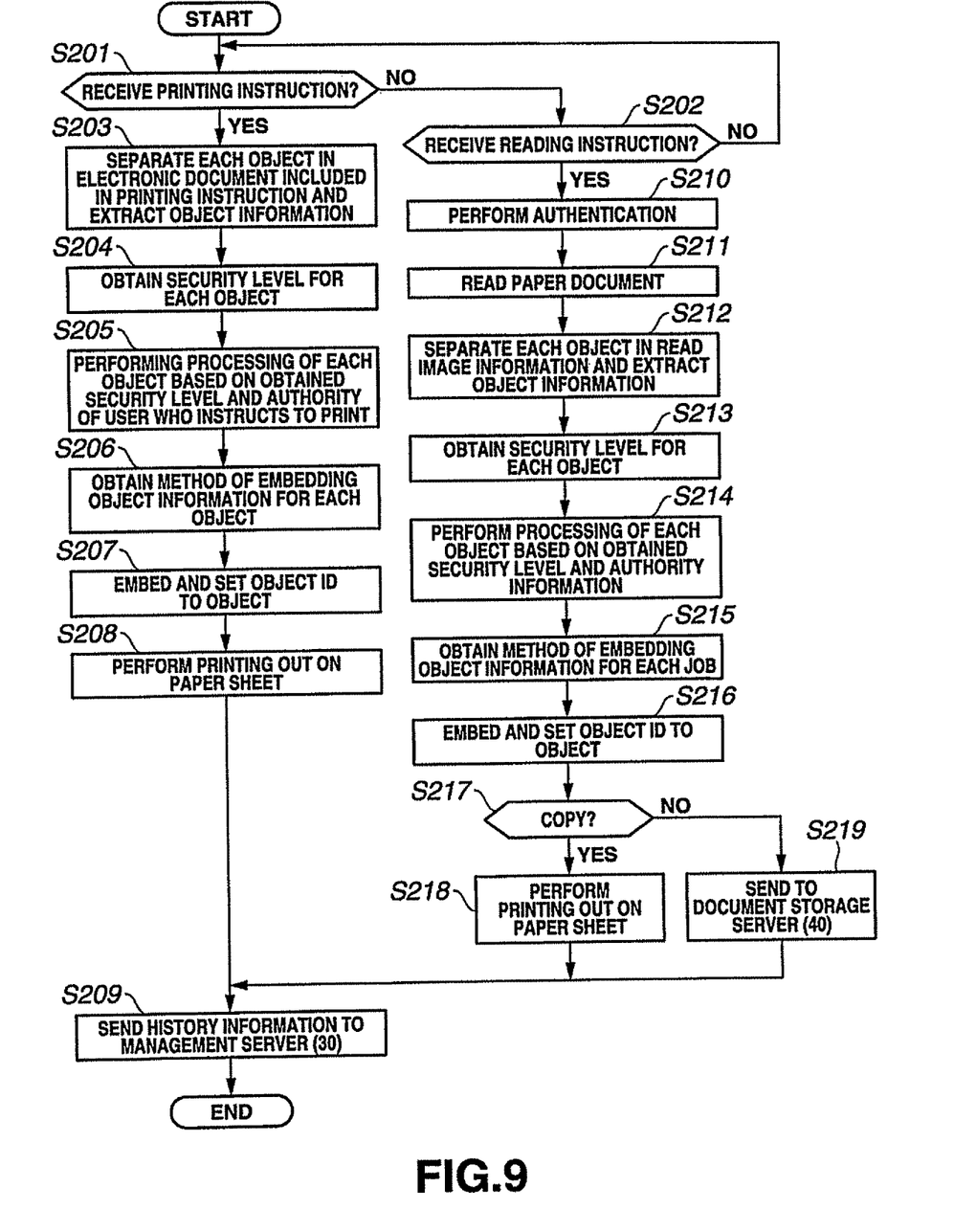
FIG. 9 is a flow chart showing a flow of operation in an image processing device 20 shown in FIGS. 1 and 7.
Figure 10:
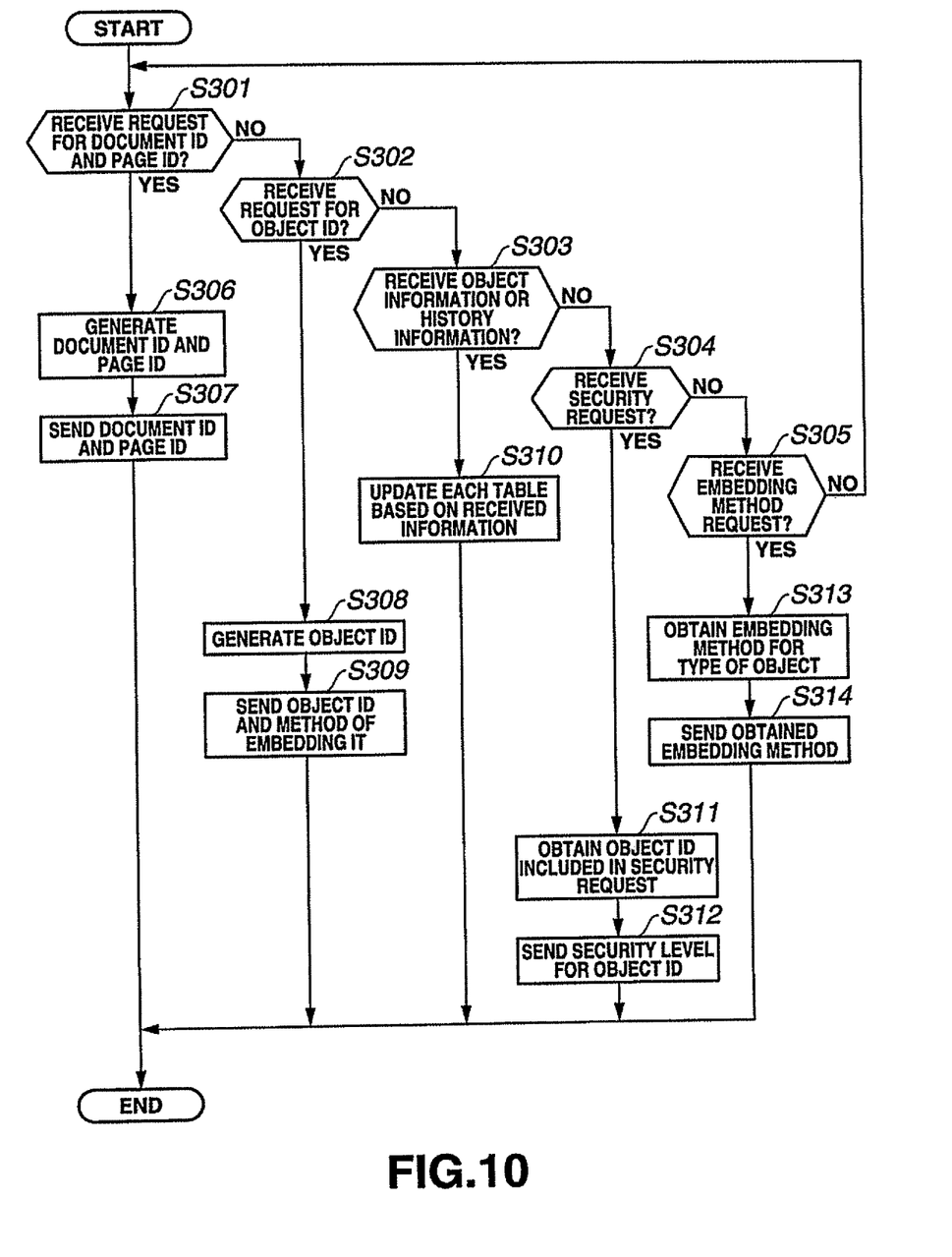
FIG. 10 is a flow chart showing a flow of operation in a management server 30 shown in FIGS. 1 and 7.
Figure 11:
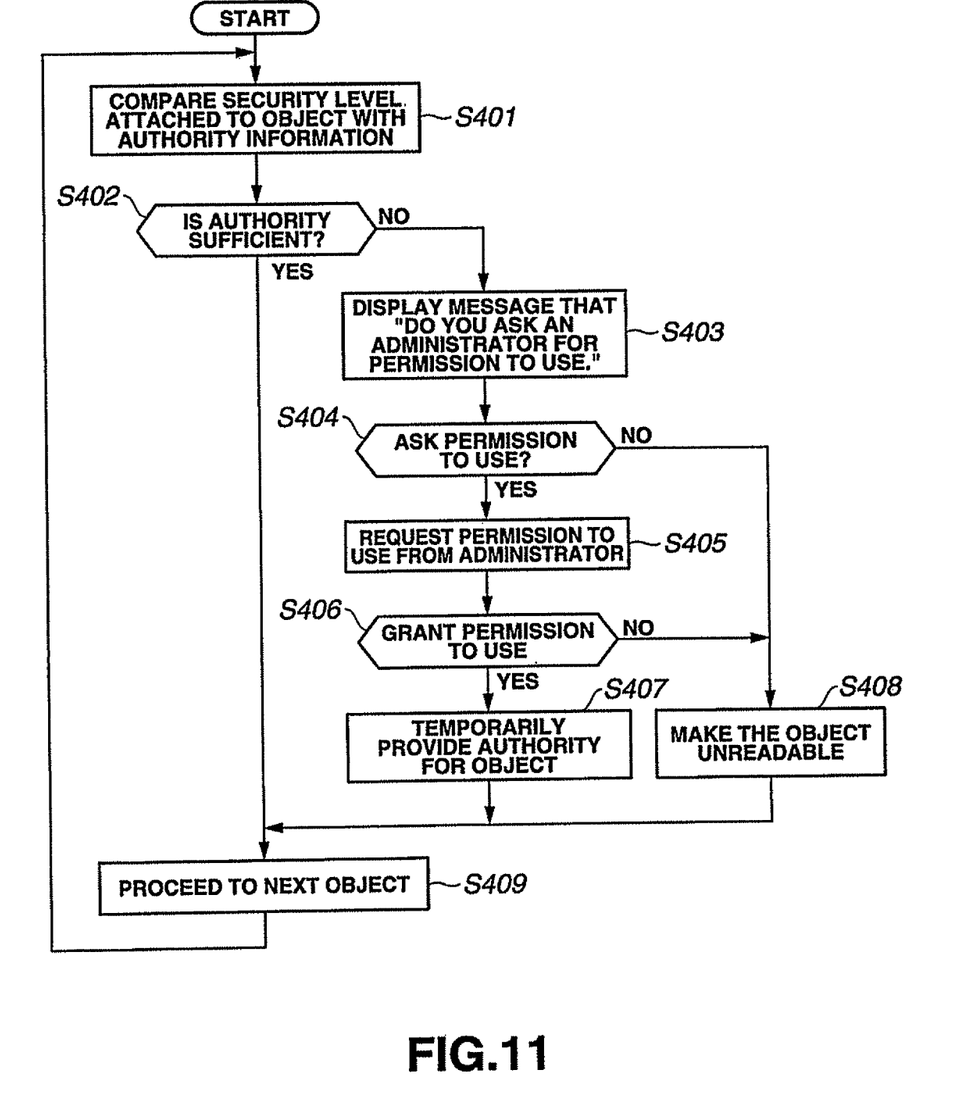
FIG. 11 is a diagram showing an example of modification.

Additionally, in the description above, the object is made unreadable through being blacked out and so on if a higher authority is required to meet a security level attached to the object (steps S205 and S214 in FIG. 9). However, it may be possible to employ a configuration in which, if a higher authority is required for the object, an authority that meets the security level of the object is temporarily provided. The processing in this case will be described using FIG. 11. It should be noted that the processing shown in FIG. 11 is implemented in steps S205 and S214 in FIG. 9.

In this processing, the security level attached to the object is compared with authority information of the user (step 8401). If the authority of the user is sufficient (YES in step S402), the processing proceeds to the comparing step for the next object (step S409). However, if the authority is not sufficient (NO in step S402), the image processing device 20 displays a message to the effect that "Do you ask an administrator for permission to use?" (step S403). If the user chooses not to ask the permission to use (NO in step S404), the image processing device 20 makes the object unreadable through blacking out and so on (step S408), and the processing proceeds to the next. If the user chooses to ask the permission to use (YES in step S404), the image processing device 20 requests the permission to use from the administrator via the management server 30 (step S405). For example, the administrator checks through a mail and so on describing who makes the request for which object.

If the permission to use is granted (YES in step S406), the management server 30 temporarily provides the authority for the object (step S407), and the image processing device 20 proceeds to the comparison step of the next object (step S409). If the permission is not granted (NO in step S406), the image processing device 20 makes the object unreadable through blacking out and so on (step S408), and proceeds to the processing of the next object. It should be noted that, in the processing in step S407 above, it may be possible to employ a configuration in which the authority for the object is temporarily provided in accordance with a period or frequency. Additionally, the permission to use plural objects may be requested in a collective manner. Furthermore, the permission to use may be requested simultaneously for plural administrators. These are descriptions of the operational flow in the case where the authority for the object is temporarily provided to the user whose authority is not sufficient.

It should be noted that a program operable in the client 10, the image processing device 20, the management server 30 and the document storage server 40 may be provided by being recorded in an external recording medium such as a CD-ROM and so on as well as through communication means such as network and so on.

The foregoing description of the exemplary embodiment of the present invention is provided for the purposes of illustration and description. It is not intended to be exhaustive or to limit the invention to the precise forms disclosed. Obviously, many modifications and variations will be apparent to practitioners skilled in the art The exemplary embodiment was chosen and described in order to best explain the principles of the invention and its practical applications, thereby enabling others skilled in the art to understand the invention for various embodiments and with the various modifications as are suited to the particular use contemplated. It is intended that the scope of the invention be defined by the following claims and their equivalents.

What is claimed is:

1. A document management system, comprising:
   a management device that manages unique identification information and confidentiality level information, each of which correspond to a component of a plurality of components in an electronic document or in a paper document, the electronic document or the paper document having the plurality of components that are at least one of a graphic, a table, an image, and a text;
   a setting device that sets the unique identification information to each component of the plurality of components included in the electronic document or included in the paper document;
   an instruction receiving device that receives an instruction from a user to print the electronic document or an instruction from the user to read the paper document;
   an authority information receiving device that receives authority information of the user;
   a confidentiality level information obtainment device that obtains the confidentiality level information corresponding to each component of the plurality of components of the electronic document or the paper document; and
   a confidentiality processing device that performs image processing on each component of the plurality of components of the electronic document or the paper document based on a comparison between the confidentiality level information corresponding to the unique identification information of the component and the authority information of the user, wherein
   the setting device sets the unique identification information to each component of the plurality of components after the image processing is completed by the confidentiality processing device.

2. The document management system according to claim 1, wherein
   the setting device sets the unique identification information in the electronic document or in the paper document to the space between characters or using jaggy of a character when the component is a text component.

3. The document management system according to claim 1, wherein
   the setting device sets the unique identification information to each component of the plurality of components in a manner according to the document managed by the management device, the document being the electronic document or the printed document.

4. The document management system according to claim 1, wherein
   the confidentiality processing device compares the confidentiality level information of each component of the plurality of components with the authority information of the user, and for each component of the plurality of components, if an authority of the authority information of the user is insufficient, the confidentiality processing device temporarily rants a sufficient authority for the corn orient to the user based on a request of the user.

5. A management apparatus, comprising:
   a management device that manages unique identification information and confidentiality level information, each of which correspond to a component of a plurality of components in an electronic document or in a paper document, the electronic document or the paper document having the plurality of components that are at least one of a graphic, a table, an image, and a text;
   a confidential level management device that manages the confidentiality level information of each component of the plurality of the components corresponding to the unique identification information managed by the management device;
   a confidentiality processing device that performs image processing on each component of the plurality of components of the electronic document or the paper document based on the confidentiality level information managed by the confidential level management device.

6. A non-transitory computer readable recording medium storing a document management program that causes a computer to execute a process, the process comprising:
   managing unique identification information and confidentiality level information, each of which correspond to a component of a plurality of components in an electronic document or in a paper document, the electronic document or the paper document having the plurality of components that are at least one of a graphic, a table, an image, and a text;
   setting the unique identification information to each component of the plurality of components included in the electronic document or included in the paper document;

receiving an instruction from a user to print the electronic document or an instruction form the user to print the paper document;
receiving authority information of the user;
obtaining the confidentiality level information corresponding to each component of the plurality of components of the electronic document or the paper document;
comparing the confidentiality level information corresponding to the unique identification information of the component and the authority information of the user; and
performing image processing on each component of the plurality of components of the electronic document or the paper document based on the comparison, wherein
the unique identification information is set after the image processing is performed.

7. A microprocessor implemented document management method, comprising:
managing unique identification information and confidentiality level information, each of which correspond to a component of a plurality of components in an electronic document or in a paper document, the electronic document or the paper document having the plurality of components that are at least one of a graphic, a table, an image, and a text;
setting, via the microprocessor, the unique identification information to each component of the plurality of components included in the electronic document or included in the paper document;
receiving an instruction from a user to print the electronic document or an instruction form the user to print the paper document;
receiving authority information of the user;
obtaining the confidentiality level information corresponding to each component of the plurality of components of the electronic document or the paper document;
comparing the confidentiality level information corresponding to the unique identification information of the component and the authority information of the user; and
performing image processing on each component of the plurality of components of the electronic document or the paper document based on the comparison, wherein
the unique identification information is set after the image processing is performed.

8. The document management system according to claim 1, wherein the confidentiality processing device compares the confidentiality level information of each component of the plurality of components with authority information of the user, and for each component of the plurality of components, if the authority information of the user is insufficient, the confidentiality processing device makes the unauthorized component unreadable by performing an image processing to black out or erase the component from the electronic document or from the paper document.

9. The microprocessor implemented document management method according to claim 7, further comprising:
if in comparing the confidentiality level information corresponding to the unique identification information of the component and the authority information of the user, the authority information of the user is insufficient, making the unauthorized component unreadable by performing an image processing to black out or erase the component from the electronic document or from the paper document.

10. The document management system according to claim 1, further comprising a history management device that manages history information of each component of the plurality of components that correspond to the unique identification information that is set to each of the component by the setting device.

11. The non-transitory computer readable recording medium according to claim 6, further comprising managing history information of each component of the plurality of components that correspond to the unique identification information that is set to each of the component.

12. The microprocessor implemented document management method according to claim 7, further comprising managing history information of each component of the plurality of components that correspond to the unique identification information that is set to each of the component.

13. The document management system according to claim 10, wherein the history information further includes information specifying, within the electronic document or the paper document, a page from which the component is removed, and a page to which the cut component is pasted.

14. The processor implemented document management method according to claim 11, wherein the history information further includes information specifying, within the electronic document or the paper document, a page from which the component is removed; and a page to which the cut component is pasted.

15. The non-transitory computer readable recording medium according to claim 12, wherein the history information further includes information specifying, within the electronic document or the paper document, a page from which the component is removed, and a page to which the cut component is pasted.

16. The document management system according to claim 4, further comprising a display device that displays an output to the user, wherein
if the authority of the authority information of the user is insufficient, the display device prompts the user for authority information of an administrator level.

17. A document management system comprising:
a management device that manages unique identification information and confidential level information, both of which correspond to a component of a plurality of components in a document, the document having the plurality of components that are at least one of a graphic, a table, an image, and a text;
a setting device that sets the unique identification information to each component of the plurality of components included in the document; and
a confidentiality processing device that performs image processing on each component of the plurality of components of the document based on confidentiality level information which is set to each component of the plurality of components, wherein
the setting device sets the unique identification information to each component of the plurality of components when the image processing is completed by the confidentiality processing device.

18. The document management system according to claim 17, wherein the setting device sets the unique identification information to, in the document, the space between characters or using jaggy of a character, when the component is text component.

19. The document management system according to claim 1, wherein the confidentiality processing device compares the confidentiality level information of each component of the plurality of components with authority information of a user, and for each component of the plurality of components, if the authority of the user is not sufficient, the confidentiality processing device makes the unauthorized component unreadable by performing an image processing.

* * * * *